US011611312B1

(12) United States Patent
Staniulis, Jr.

(10) Patent No.: US 11,611,312 B1
(45) Date of Patent: Mar. 21, 2023

(54) SOLAR PANEL CLEANING APPARATUS

(71) Applicant: Anthony Staniulis, Jr., Las Vegas, NV (US)

(72) Inventor: Anthony Staniulis, Jr., Las Vegas, NV (US)

(*) Notice: Subject to any disclaimer, the term of this patent is extended or adjusted under 35 U.S.C. 154(b) by 0 days.

(21) Appl. No.: 17/832,704

(22) Filed: Jun. 6, 2022

(51) Int. Cl.
*H02S 40/10* (2014.01)
*B08B 3/02* (2006.01)

(52) U.S. Cl.
CPC .............. *H02S 40/10* (2014.12); *B08B 3/024* (2013.01); *B08B 2203/0223* (2013.01)

(58) Field of Classification Search
CPC .. H02S 40/10; B08B 3/024; B08B 2203/0223
See application file for complete search history.

(56) References Cited

U.S. PATENT DOCUMENTS

| | | | | |
|---|---|---|---|---|
| 8,813,303 | B1* | 8/2014 | Meller | H02P 3/14 126/903 |
| 9,080,791 | B1* | 7/2015 | Meller | A46B 13/02 |
| 9,130,502 | B1* | 9/2015 | Aly | F26B 21/004 |
| 9,455,665 | B1* | 9/2016 | Meller | H02J 7/35 |
| 11,316,469 | B1* | 4/2022 | Saha | B08B 1/001 |
| 2009/0293932 | A1* | 12/2009 | Augenbraun | H01L 31/02008 136/244 |
| 2013/0067666 | A1* | 3/2013 | Liao | B08B 3/04 15/21.1 |
| 2013/0206173 | A1* | 8/2013 | Zijlstra | B08B 3/024 134/6 |
| 2014/0182638 | A1* | 7/2014 | Tebbens | B08B 5/04 134/198 |
| 2014/0283417 | A1* | 9/2014 | Annen | E04D 13/106 37/197 |
| 2015/0144156 | A1* | 5/2015 | French | B08B 1/04 134/6 |
| 2015/0244311 | A1* | 8/2015 | Nakagawa | B08B 1/04 134/180 |
| 2016/0294319 | A1* | 10/2016 | Ram | A46B 13/001 |
| 2017/0019570 | A1* | 1/2017 | Meller | H04N 5/2258 |
| 2017/0163209 | A1* | 6/2017 | Bailey | H02S 40/34 |
| 2017/0179873 | A1* | 6/2017 | Eitelhuber | B08B 1/04 |
| 2018/0119994 | A1* | 5/2018 | Helming | F24S 20/70 |
| 2019/0009313 | A1* | 1/2019 | Choori | H02J 3/381 |
| 2019/0074793 | A1* | 3/2019 | Chen | B08B 1/008 |
| 2019/0214940 | A1* | 7/2019 | Allouche | B08B 1/008 |
| 2021/0265944 | A1* | 8/2021 | Tanaka | B08B 1/04 |

* cited by examiner

*Primary Examiner* — Benjamin L Osterhout
(74) *Attorney, Agent, or Firm* — Bayramoglu Law Offices LLC

(57) ABSTRACT

A solar panel cleaning apparatus includes at least two rails in which a fluid pipe moves over the surface of a solar panel and sprays a fluid onto the surface of the solar panel in order to remove dust, dirt, film and debris. Nozzles are part of the fluid pipe which sprays the fluid on the surface of the solar panel. Each rail includes grooves along a surface of the rail and wheels are propelled along the grooves the rail. A fluid conduit is attached to at least one wheel within one of the rails and is in fluid communication with the fluid pipe. A self-aligning bearing is connected to the wheels to keep the fluid conduit from winding around itself or the wheel. Humidity and wind sensors control the start and stop of a pump.

20 Claims, 8 Drawing Sheets

SOLAR PANEL CLEANING APPARATUS

TECHNICAL FIELD

The present disclosure relates to a cleaning apparatus. More specifically, the present disclosure relates to a cleaning apparatus attached to a device such as at least one solar panel in order to clean a surface of one or more solar panels with a fluid.

BACKGROUND

The existing technology of cleaning solar panels is to use manual labor to install and/or remove and/or operate washing of solar panels.

Contrarily, the disclosure and the invention provide a fully automated apparatus and/or system to operate and wash surfaces such as solar panels without any need for manual labor.

Since many solar panels and other surfaces which require cleaning are located in places which are difficult to access or are in remote places which many not be economically feasible to travel to frequently, it is imperative that a cleaning system and/or apparatus provide a fully automotive as well as requiring no or very little maintenance over a very long time duration. This is what this invention and disclosure provides by having a cleaning apparatus which does not requires manual labor to clean solar panel surfaces; can sustain harsh weather conditions; and will require very little maintenance over a very long time duration and thus provide an energy saving, efficient, and lost cost cleaning apparatus for surfaces such as solar panels.

SUMMARY

The invention and disclosure are a cleaning apparatus which comprises rails; a fluid pipe having nozzles; a moving mechanism; an open cover; a fluid conduit; self-positioning/aligning bearings; a pump; a tank; a solenoid value; and at least one of a humidity sensor and a wind speed sensor.

The cleaning apparatus can be attached to and clean any surface which needs cleaning such as one or more solar panels, windows, boat hulls and decks, floors, roofs of vehicles and structures such as buildings, sheds and houses.

The solar panel cleaning apparatus includes at least two rails in which a fluid pipe moves over the surface of a solar panel and sprays a fluid onto the surface of the solar panel in order to remove dust, dirt, film and debris.

Nozzles are part of the fluid pipe which sprays the fluid on the surface of the solar panel.

Each rail includes grooves along a surface of the rail and wheels are propelled along the grooves the rail.

A moving mechanism moves the fluid pipe up and down the rails and over the entire surface to be cleaned such as a top surface of a solar panel.

Also, a humidity sensor and a wind sensor are in wire or wireless communication with a solenoid valve and a pump in order to turn on and off the pump and open and close the solenoid valve so that the cleaning apparatus operates in the desired weather conditions.

BRIEF DESCRIPTION OF THE DRAWINGS

In order to more clearly illustrate the embodiments of the present disclosure, a brief description of the drawings is given below. The following drawings are only illustrative of some of the embodiments of the present disclosure and for a person of ordinary skill in the art, other drawings or embodiments may be obtained from these drawings without inventive effort.

DETAILED DESCRIPTION

Figure 1:
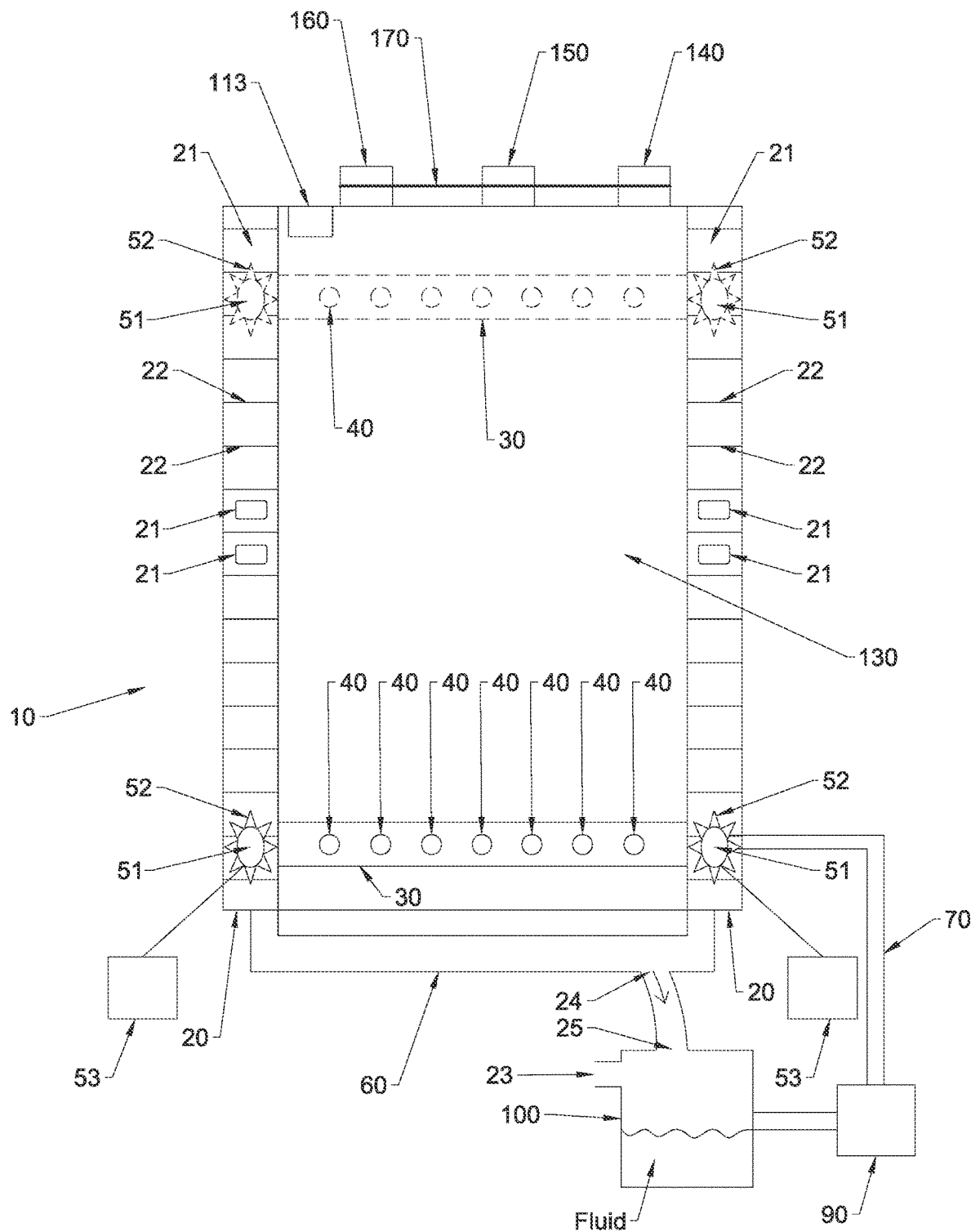
FIG. 1 is a schematic top view of a cleaning apparatus.

The technical solutions of the present disclosure will be clearly and completely described below with reference to the drawings. The embodiments described are only some of the embodiments of the present disclosure, rather than all of the embodiments. All other embodiments that are obtained by a person of ordinary skill in the art on the basis of the embodiments of the present disclosure without inventive effort shall be covered by the protective scope of the present disclosure.

In the description of the present disclosure, it is to be noted that the orientational or positional relation denoted by the terms such as "center", "upper", "lower", "left", "right", "vertical", "horizontal", "inner" and "outer" is based on the orientation or position relationship indicated by the figures, which only serves to facilitate describing the present disclosure and simplify the description, rather than indicating or suggesting that the device or element referred to must have a particular orientation, or is constructed or operated in a particular orientation, and therefore cannot be construed as a limitation on the present disclosure. In addition, the terms "first", "second" and "third" merely serve the purpose of description and should not be understood as an indication or implication of relative importance.

In the description of the present disclosure, it should be noted that unless otherwise explicitly specified and defined, the terms "install", "link", "attached" and "connect" shall be understood in the broadest sense, which may, for example, refer to fixed connection, detachable connection or integral connection; may refer to mechanical connection or electrical connection; may refer to direct connection or indirect connection by means of an intermediate medium; and may refer to communication between two elements. A person of ordinary skill in the art would understand the specific meaning of the terms in the present disclosure according to specific situations.

FIGS. 1-8 illustrate the present invention of a cleaning apparatus 10.

FIGS. 1-8 illustrate a cleaning apparatus 10 comprises rails 20; a fluid pipe 30 having nozzles 40; a moving mechanism 50; an open cover 60; a fluid conduit 70;

self-positioning/aligning bearings 80; a pump 90; a tank 100; a solenoid value 110; and at least one sensor 120.

The cleaning apparatus 10 can be attached to and clean any surface which needs cleaning such as one or more solar panels 130, windows, boat hulls and decks, floors, roofs of vehicles and structures such as buildings, sheds and houses.

Figure 8:
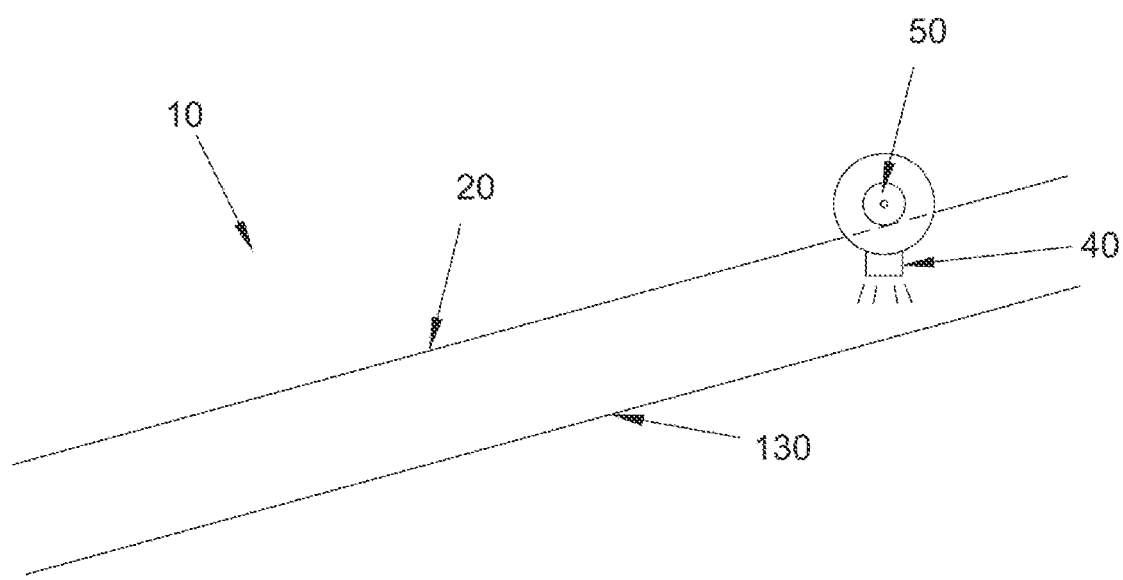
FIG. 8 is a schematic side view of the cleaning apparatus of FIG. 1.

As shown in FIGS. 1 and 8, there are at least two rails 20 attached to one or more solar panels 130. The rails 20 are attached to a side or a face of the solar panel 130 with an adhesive pad, fasteners, tape, screws, rivet's, and/or any type of fastening system. For example, there may be a plurality of solar panels 130 positioned in a plurality of rows and a first rail 20 is attached to a side of one solar panel 130 in a row of solar panels 130 and a second rail 20 is attached to another solar panel 130 which is in the same row of solar panels 130 that the one solar panel 130 is within. More specifically, the first rail 20 is attached to a side of the first solar panel 130 in a row of solar panels 130 and a second rail 20 is attached to the last solar panel 130 in the row of solar panels 130 to which the one solar panel 130 is within. Alternatively, a first rail 20 and the second rail 20 are attached to a side of any one solar panel 130 in any and/or all rows of solar panels 130. Each rail 20 has a channel 21 therein and grooves 22 within the channel 21. The rails 20 are made from high-density polyethylene (HDPE) in order to solve the problem of preventing the rails 20 from rusting over time due to the rails 20 being exposed to rain and moisture; preventing the rails 20 from the formation of mold, mildew, calcination and deposits of metals; and preventing the rails 20 from thermal warping. The rails could be linear guide rails.

The moving mechanism 50 comprises wheels 51 and a power source 53. The wheels 51 have cogs 52 which engage the grooves 22 of the rails 20 such that the wheels 51 move, due to the power source 53, up and down the rails 20 within the grooves 22 of the rails 20 and over an entire surface to be cleaned such as a top surface, the surface facing the sun, of a solar panel 130. The power source 53 may be a motor; magnets; solar power; hydro power; a DC power source such as a battery or batteries; an AC power source such as power plants; a DC/AC inverter; and the combination thereof. When the power source 53 comprises a motor, magnets 21 are place on the rails 20 or embedded within the material of the rails 20, where the rails 20 are made from any metal or alloy such as steel, aluminum, titanium, stainless steel or any equivalent metal and thus the motor drives the wheels 51 along the rails 20. The wheels 51 and cogs 52 may be made from metal or an alloy and the external surfaces of the wheels 51 and cogs 52 are coated with HDPE. However, the wheels 51 may be made from metal or an alloy and the external surfaces, including the cogs 52, of the wheels 51 are coated with HDPE and the cogs 52 are made from metal. If desired, the cogs 52 may not be coated.

A tank 100 containing a fluid is in fluid communication such as a pipe with a pump 90 and a fluid pipe 30 is in fluid communication with the tank 100 and the pump 90 such that the pump 90 pumps the fluid from the tank 100 to the fluid pipe 30 and the fluid then passes through nozzles 40 attached to or integral with the fluid pipe 30 onto a surface to be cleaned such as a solar panel 130. The fluid pipe 30 is connected to each wheel 51 within each rail 20. The fluid tank 100 comprises a fluid inlet 23. The fluid may be filled through the fluid inlet 23 with water from a facility or building; deionized water; an antifreeze fluid such as a mixture of ethylene glycol and water; a mixture of soap mixed with one-part vinegar and eight-parts water; or Empowered Water® (i.e. a mixture of water and Sodium Hydroxide). The fluid pipe 30 and nozzles 40 are made from HDPE in order to solve the problem of preventing the fluid pipe 30 and nozzles 40 from rusting over time due to fluid pipe 30 and nozzles 40 being exposed to rain and moisture; preventing the fluid pipe 30 and nozzles 40 from the formation of mold, mildew, calcination and deposits of metals; and preventing fluid pipe 30 and nozzles 40 from thermal warping. However, the fluid pipe 30 may be a metal, alloy or steel pipe where the inside of the fluid pipe 30 which the fluid contact is coated with HDPE and strengthening rods are inserted inside the HDPE all around the circumference of the fluid pipe 30. The strengthening rods may be metal, alloy or composite rods and provide structural rigidity and reduce warping. The fluid pipe 30 may also have both orifices 41 and nozzles 40 or just have orifices 41 but not limited to orifices 41 and nozzles 40 since elements with different shapes and diversion of different spray patterns can be used in conjunction with the fluid pipe 30.

A fluid conduit 70 connects the pump 90 to the fluid pipe 30, where the connection of the fluid conduit 70 to the fluid pipe 30 is made by the fluid conduit 70 being connected through and/or to a self-aligning bearing 80 and the self-aligning bearing 80 is attached to one wheel 51 within a rail 20. The fluid conduit 70 being connected through and/or to the self-aligning bearing 80 prevents the fluid conduit 70 from coiling round itself or other devices when the wheel 51 is translating up and down the rail 20 when cleaning the surface of a solar panel 130. In order for the fluid pipe 30 to not rotate, self-aligning bearings 80 are attached to each wheel 51 within the rails 20 and each end of the fluid pipe 30 is attached to a wheel 51. The end (i.e. a first end) of the fluid pipe 30, which is connected to a fluid exit end (i.e. a second end) of the fluid conduit 70 of one wheel 51 (i.e. a first wheel 51), is open so water flows from the fluid conduit 70 to the fluid pipe 30 and the other end (i.e. a second end) of the fluid pipe 30, which is connected to another wheel 51 (i.e. a second wheel 51), is closed and/or sealed and forms a water tight seal so the fluid cannot flow out the other end (i.e. a second end) of the fluid pipe 30 and thus the fluid will flow out of the nozzles 40 from within the fluid pipe 30. The fluid conduit 70 is made of a flexible conduit such as a flexible hose or any flexible material conduit, where the flexible material is a thermoplastic rubber; polyvinyl chloride (PVC); polyurethane; neoprene; silicone; or polyethylene.

Figure 6:
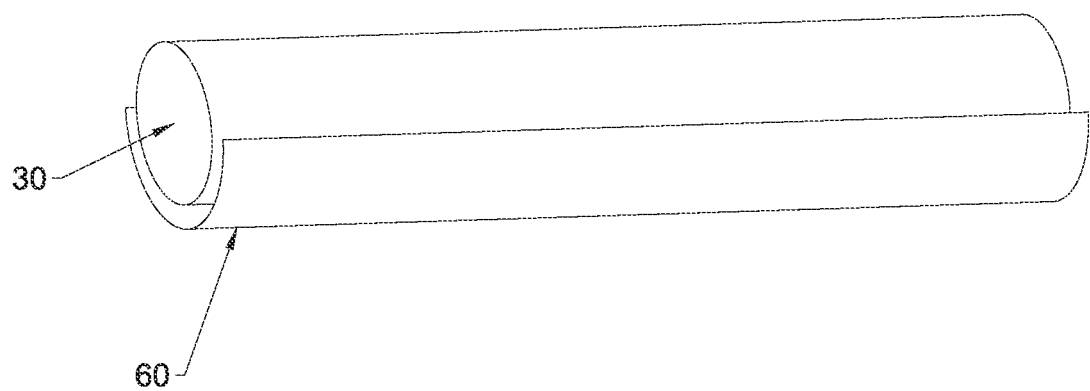
FIG. 6 is a perspective view of the fluid pipe located/positioned within an open cover.

As illustrated in FIG. 1 and FIG. 6, an open cover 60 is attached to one end of the solar panel 130. Preferably, the open cover 60 is attached to the end of the solar panel 130 which is closest to the ground (i.e. ground of the earth) and the fluid pipe 30 resides within the open cover 60 when the fluid pipe 30 is not traversing over the surface of the solar panel 130 as shown in FIG. 6. When the cleaning apparatus 10 is to perform cleaning of surface(s), the fluid pipe 30 will move out of the open cover 60 via the rails 20 and the power source 53, since the rails 20 extend into the open cover 60. When the cleaning of the surface(s) is completed, the fluid pipe 30 will move down into the open cover 60 via the rails 20. Any fluid which is collected within the open cover 60 can flow into the tank 100 from an outlet 24 of the open cover 60 to an opening 25 in the top of the tank 100. Thus, the fluid pipe 30 will be located/positioned within the open cover 60 when the fluid pipe 30 is not being used for cleaning (i.e. not moving over a surface, such as solar panel(s) 130). When a surface, such as solar panel(s) 130, is to be cleaned, the fluid pipe 30 will moved out of the open cover 60 and move up and down the rails 20 in order to clean the surface, such as solar panel(s) 130.

Figure 7:
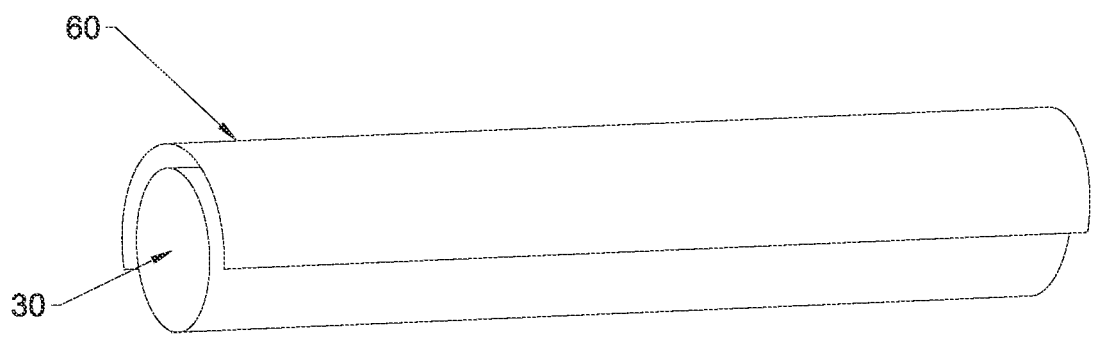
FIG. 7 is a perspective view of the fluid pipe located/positioned under the open cover.

FIG. 7 illustrates the fluid pipe 30 alternatively can reside underneath the open cover 60 when the fluid pipe 30 is not traversing over the surface of the solar panel 130. When the cleaning apparatus 10 is to perform cleaning of surface(s), the fluid pipe 30 will move from underneath the open cover 60 via the rails 20 and the power source 53, since the rails 20 extend under the open cover 60. When the cleaning of the surface(s) is completed, the fluid pipe 30 will move underneath the open cover 60 via the rails 20. Thus, the fluid pipe 30 will be located/positioned underneath the open cover 60 when the fluid pipe 30 is not being used for cleaning (i.e. not moving over a surface, such as solar panel(s) 130). When a surface, such as solar panel(s) 130, is to be cleaned, the fluid pipe 30 will move from underneath of the open cover 60 and move up and down the rails 20 in order to clean the surface, such as solar panel(s) 130.

Any type of mechanical, hydraulic or electrical lift and/or lift mechanism could also move the fluid pipe 30 to and from the rails 20 and to and from underneath the open cover 60 or move the fluid pipe 30 to and from the rails 20 and to and from within the open cover 60. For example, arms and/or rods which are pivotally attached, via fasteners and/or bearings, and/or adhesive, and/or glue, to each of the rails 20 can pivot relative to the rails 20 and lift the fluid pipe 30 onto the rails 20 and remove the fluid pipe 30 off the rails 20 and to and from within the open cover 60 and to and from underneath the open cover 60.

Figure 2:
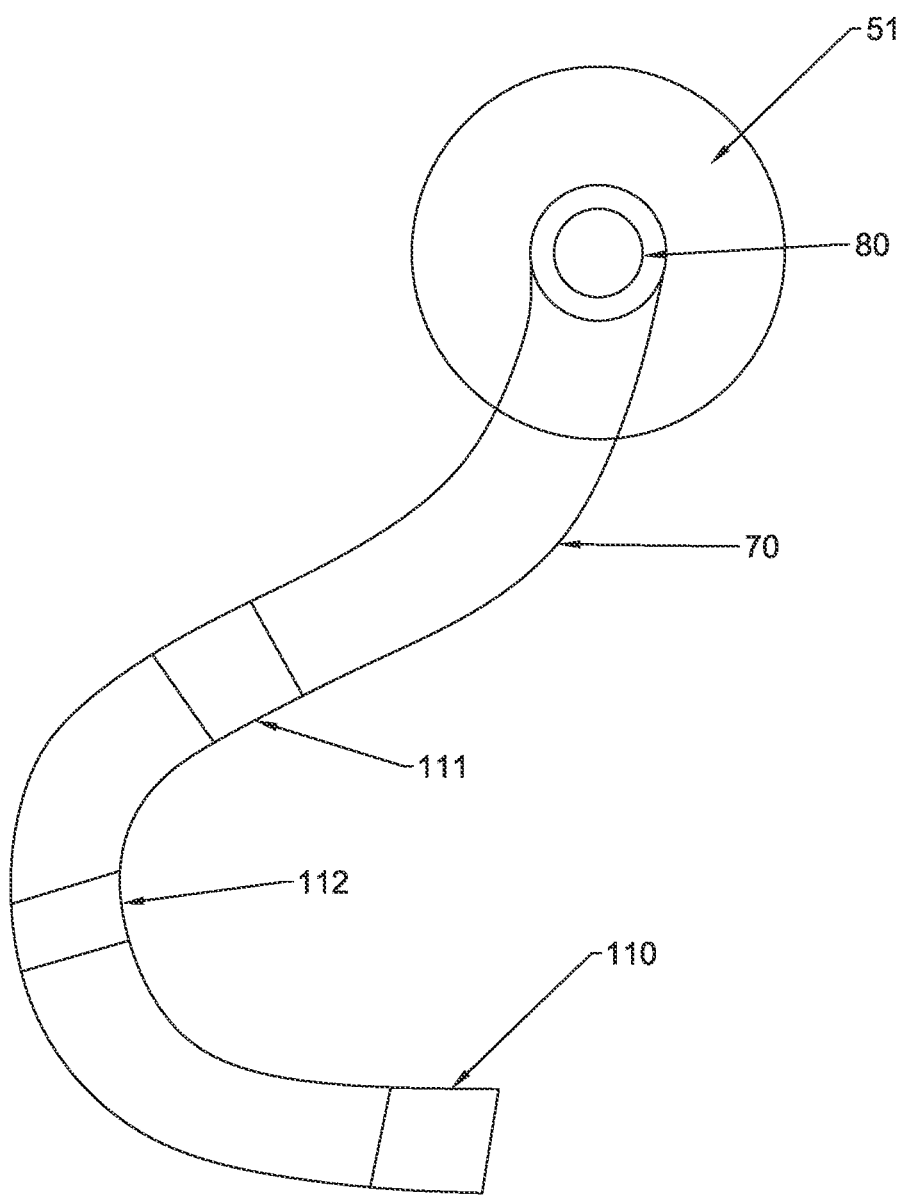
FIG. 2 is a schematic perspective side view of the details of a wheel without the cogs (i.e. just for simplicity in the illustration) and a fluid conduit.

As shown in FIG. 2, when the fluid pipe 30 is to be moved up and down the surface of the solar panel(s) 130 hydraulically, solenoid valves 110 are connected to and in fluid communication with the fluid conduit 70 and with or within the power source is a motor. Also, a check valve 111 and a line reversing valve 112 are connected to and in fluid communication with the fluid conduit 70. A lever 113 is attached to any one of the rails 20 and/or the solar panel 130 such that when the fluid pipe 30 contacts the lever 113, the fluid pipe 30 will reverse direction and move back down the rails 20 due to the level 113 being in wire or wireless communication with the solenoid values 110 and this reverses the motors direction and thus reverses direction of the fluid pipe 30.

Referring again to FIG. 1, a timer 140 is connected via a wire or wireless communication with the pump 90 in order to turn on the pump 90 and start a cleaning operation of the solar panels 130. For example, in the summer time or any time the timer 140 is set during warm weather such as (i.e. for example) ambient temperature is 80 degrees Fahrenheit (° F.) or above, the timer 140 is set to turn on the pump 90 any time after sunset in order to reduce evaporation of the fluid used for cleaning the solar panels 130 and after the timer 140 has started the pump 90, the timer 140 turns off the pump 90 after a preselected selected time of cleaning, which could be after 10 minutes or up to 5 hours. In the winter months or any time, the timer 140 is set during cold weather such as (i.e. for example) ambient temperature is 32 degrees Fahrenheit (° F.) or below, the timer 140 is set to turn on the pump 90 any time during sunlight hours.

A humidity sensor 150 and a wind sensor 160 are attached to any rail 20 and/or any surface of the solar panel 130 and/or on the open cover 60 to detect the ambient air humidity and wind speed. The humidity sensor 150 and a wind sensor 160 are in wire or wireless communication with the solenoid valve 110 and the pump 90 in order to turn on and off the pump 90 and open and close the solenoid valve 110. For example, when the humidity sensor 150 and/or the wind sensor 160 detect that the ambient air humidity and/or wind speed is/are above a set humidity and/or wind speed threshold, the pump 90 will not be allowed to be turned on and thus the fluid will not be sprayed onto the surface of the solar panel 130 and thus no cleaning of the solar panel 130 will occur even if the timer 140 was set to turn on the pump 90. Any ambient air humidity at or above 92% can be used as the threshold humidity to not turn on the pump 90 and any ambient wind speed at or above 25 mph (miles per hour) can be used to set the ambient air wind speed to not turn on the pump 90. The timer 140, humidity sensor 150 and wind sensor 160 can are wire or wireless connected with each other through a controller 170.

Figure 3:
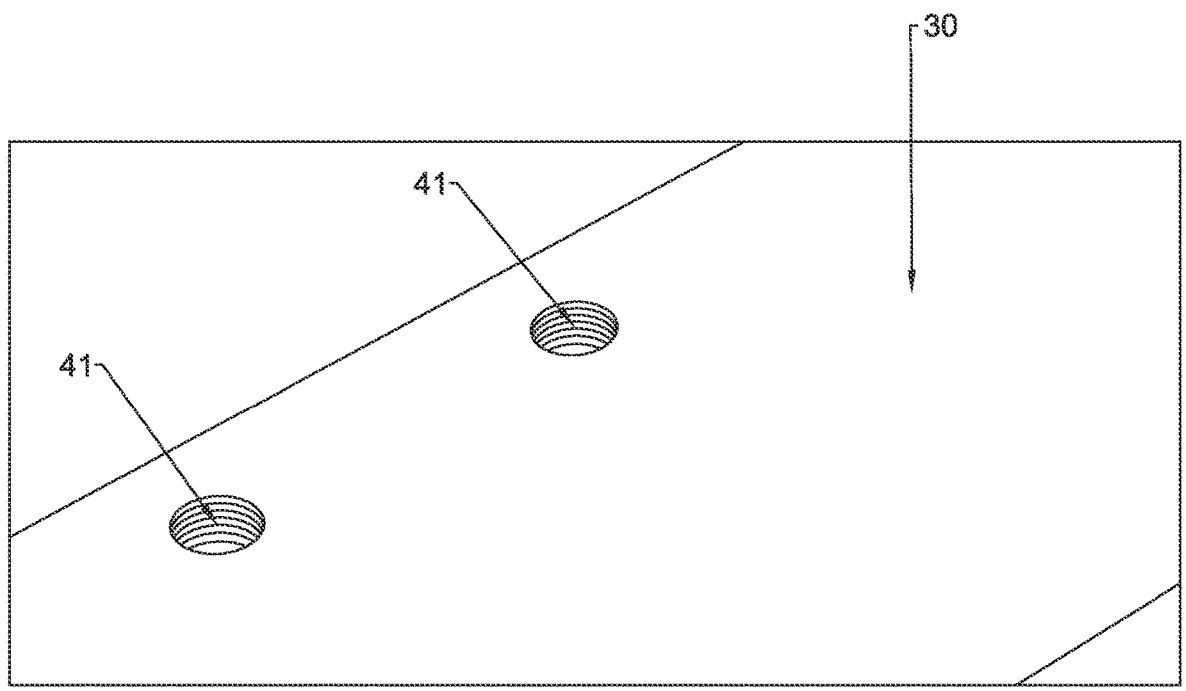
FIG. 3 is a schematic perspective top view of orifices (i.e. only two orifices are illustrated for simplicity, but more than two orifices may be incorporated into the fluid pipe) in a fluid pipe.

FIG. 3 shows the fluid pipe 30 having orifices 41 instead of nozzles 40. FIG. 3 illustrates only two orifices, but more than two orifices may and are incorporated along the length of the fluid pipe 30 in order to spray a fluid over the entire width of the surface to be cleaned such as a solar panel 130.

Figure 4:
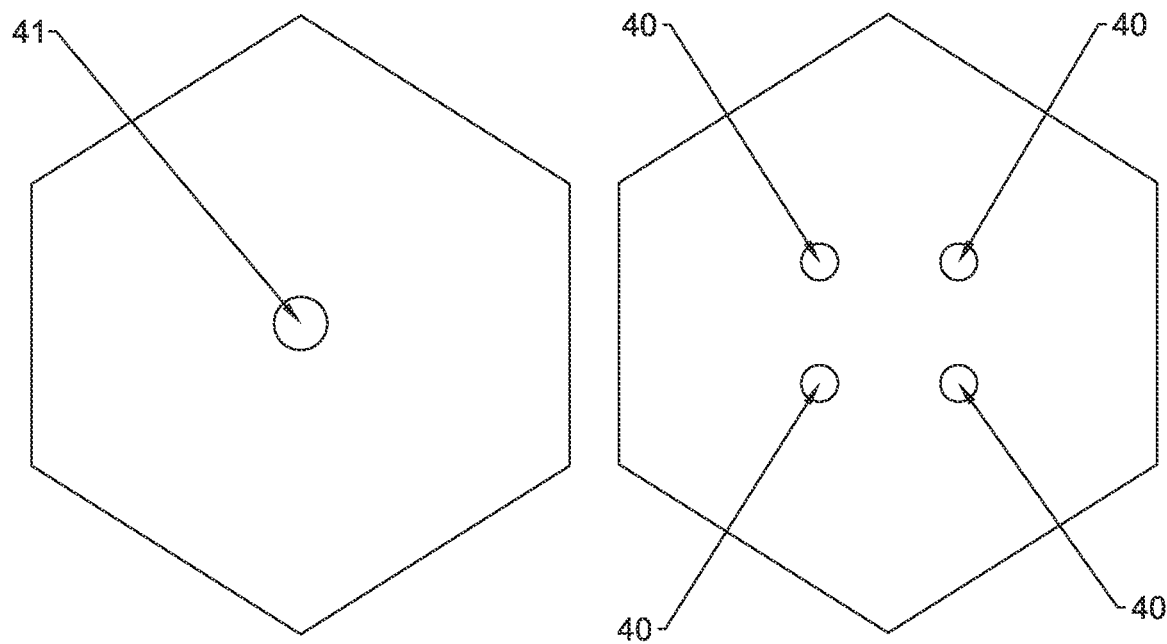
FIG. 4 is a schematic top view of nozzles and orifices (i.e. only two orifices and four nozzles are illustrated for simplicity, but more than two orifices and more than four nozzles may be incorporated into the fluid pipe) in the fluid pipe.

FIG. 4 illustrates the fluid pipe 130 having both nozzles 40 and orifices 41 along the length of the fluid pipe 130. FIG. 4 illustrates only two orifices and four nozzles but more than two orifices 41 and more than four nozzles 40 may be incorporated into the fluid pipe 130. For example, along the entire length of the fluid pipe 130, the pattern (i.e. at least one orifice 41 adjacent at least one nozzle 40) shown in FIG. 4 may be repeated along the entire length of the fluid pipe 130. Also, the end of the fluid pipe 130, which is opposite to the end of the fluid pipe 130 which has the inlet, comprises a plurality of tightly spaced and configured nozzles 40 (such as the spacing and configuration of the nozzles 40 illustrated in FIG. 4) such as four, five or even up to twenty nozzles 40 in order to remove all possible dirt from the edge of the surface which is to be cleaned such as a solar panel 130.

Figure 5:
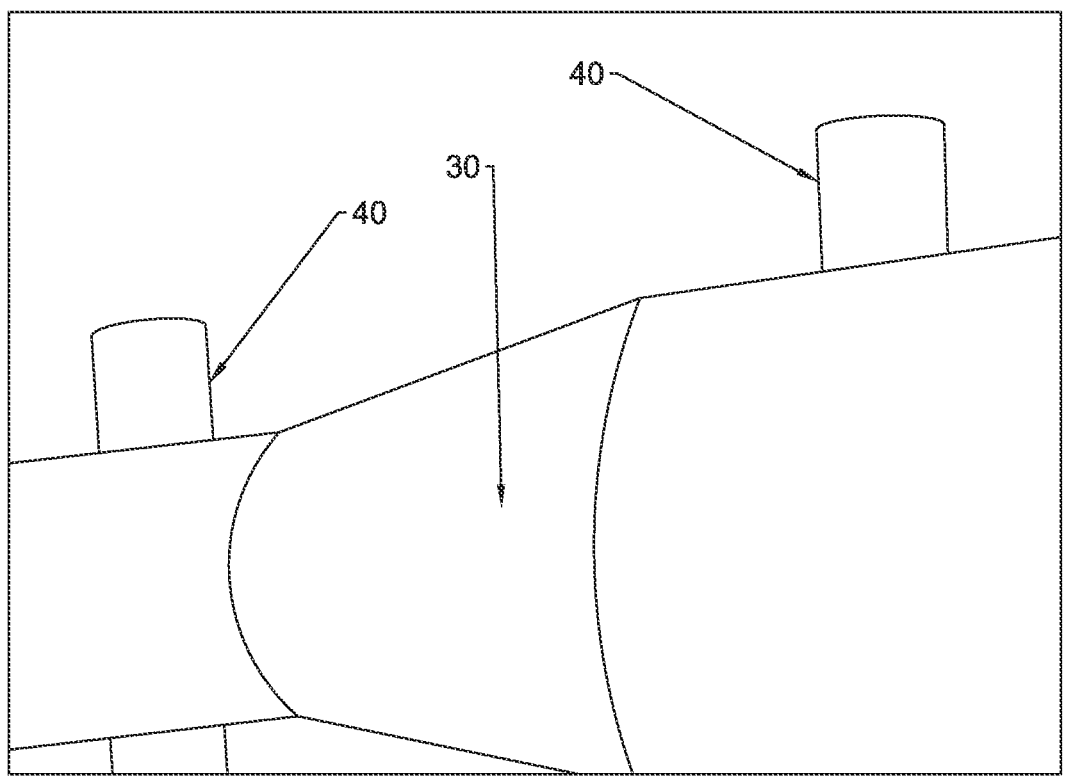
FIG. 5 is a schematic perspective side view of the fluid pipe being convergent.

FIG. 5 illustrates the fluid pipe 130 having a convergent shape, where the inlet (i.e. end of the fluid pipe 130 where the fluid enters) of the fluid pipe 130 has a larger diameter or hydraulic diameter than an opposite end of the fluid pipe 130 from the inlet of the fluid pipe 130 in order to increase the fluid pressure through the fluid pipe 130 at the opposite end of the fluid pipe 130 from the inlet of the fluid pipe 130 which provides more effective cleaning of the solar panel 130 since more dirt is removed from the edge of the solar panel which is farthest from the inlet of the fluid pipe 130.

High-density polyethylene (HDPE) or polyethylene high-density (PEHD) is a thermoplastic polymer produced from the monomer ethylene. One example of HPDE which is used is a Marine Grade HDPE such as SEABOARD™ or STARBOARD™ made by Ridout Plastics Co. Inc. The Marine Grade HDPE can be the color of polar white or any other known color. The Marine grade HDPE has superior scratch and impact resistance, high stiffness, is ultraviolet (UV) stabilized, will not delaminate, chip, rot, or swell, is easy to machine with standard tooling, is a low energy material and has no moisture absorption, is easy to clean and is FDA and USDA approved with UV additive. The thickness of the devices which are made from HDPE or the thickness of the coating of is in the range of one sixteenth of an inch to six inches. The above characteristics and benefits are needed and required to make the disclosed elements/parts prevent the formation of mold, mildew, calcination and deposits of metals, prevent thermal warping and increase the cleaning efficiency during the operational life of cleaning apparatus 10.

Polyesters are formed by polyalkylene terephthalates having alkyl groups or radicals comprising 2 to 10 carbon atoms and polyalkylene terephthalates having alkyl groups or radicals containing 2 to 10 carbon atoms which are interrupted by 1 or 2 —O—. Further, polyesters can be polyalkylene terephthalates having 5 alkyl groups or radicals containing 2 to 4 carbon atoms.

Examples of polyolefin materials are polyethylenes (PE) which include high density polyethylene (HDPE) having a density greater than 0.944 g/cm³, medium density polyethylene (MDPE) having a density in the range of 0.926 g/cm³ to 0.940 g/cm³, low density polyethylene (LDPE) having a density in the range of 0.910 g/cm³ to 0.925 g/cm³, in the form of nonoriented sheets (PE sheet) or monoaxially or biaxially oriented sheets (oPE sheet), polypropylenes (PP), such as axially or biaxially oriented polypropylene (oPP sheet) or cast polypropylene (cPP sheet), amorphous or crystalline polypropylene or blends thereof or atactic or isotactic polypropylene or blends thereof, poly(l-butene), poly(3-methylbutene), poly(4 methylpentene) and copolymers thereof, then polyethylene with vinyl acetate, vinyl alcohol or acrylic acid, such as, for example, ionomer resins, such as copolymers of ethylene, of acrylic acid, of methacrylic acid, of acrylic esters, tetrafluoroethylene or polypropylene, in addition random copolymers, block copolymers or olefin polymer/elastomer blends. The polyolefin materials can also comprise cycloolefins as monomer of a homopolymer or of copolymers.

However, polypropylenes and ionomers having the density of the range of HPDE, may be used for the disclosed elements of the invention.

Examples of polyamides (PA) for the plastics sheets are composed, for example, of polyamide 6, ε-caprolactam homopolymer (polycaprolactam); polyamide 11; polyamide 12, ω-lauryllactam homopolymer (polylauryllactam); polyamide 6,6, homopolycondensate of hexamethylenediamine and of adipic acid (poly(hexamethylene adipamide)); polyamide 6,10, homopolycondensate of hexamethylenediamine and of sebacic acid (poly(hexamethylene sebacamide)); polyamide 6,12, homopolycondensate of hexamethylenediamine and of dodecanedioic acid (poly(hexamethylene dodecanamide)) or polyamide 6-3-T, homopolycondensate of trimethylhexamethylenediamine and of terephthalic acid (poly(trimethylhexamethylene terephthalamide)), and blends thereof. The polyamide sheets are drawn monoaxially or biaxially (oPA).

One of many benefits of HDPE is from HDPE's inherent malleability such a being meltable and moldable as well as being a low-cost material. HDPE has a high melting point which is in the range of 239° F.-275° F. and therefore, HDPE remains rigid at very high temperatures. However, once HDPE reaches its melting point, the HDPE material can be quickly and efficiently molded for use. Moreover, HDPE can be shaped and/or made into any desired geometric or polygonal shape by using, for example, a 3-D printer.

Additionally, HDPE is corrosion resistance. HDPE resists mold, mildew and rotting, making HDPE the ideal material for being used as parts within the cleaning apparatus 10, which is exposed to water due, to the HDPE resisting mold and mildew which results in low maintenance and less frequent cleaning of the cleaning apparatus 10. HDPE is long-lasting and weather-resistant and can be sterilized by boiling. Additionally, HDPE can withstand most strong mineral acids and bases and has excellent resistance to naturally occurring chemicals. Moreover, the material of HDPE is non-porous and virtually impervious to most common chemicals, water, solvents, acids, detergents, and cleaning fluids. Therefore, calcination and metals from water are prevented from forming on the surface of HDPE.

HDPE has a large strength to density ratio. HDPE's linear structure means the material has little branching, which offers HDPE stronger intermolecular forces and tensile strength than MDPE and LDPE. HDPE plastic is easily recyclable and therefore reduces non-biodegradable waste from being introduced into landfills and helps reduce plastic production.

The invention claimed is:

1. A cleaning apparatus comprising:
   at least two rails, where each rail comprises a channel and are attached to a surface of a device which is to be cleaned;
   at least two wheels, where each wheel is propelled within each channel of each rail;
   a fluid pipe connected to the at least two wheels;
   a fluid conduit connected to a first end of the fluid pipe;
   a fluid within a tank; and
   a pump in fluid communication with the tank and the fluid conduit.

2. The cleaning apparatus according to claim 1, wherein the device is at least one solar panel.

3. The cleaning apparatus according to claim 1, wherein the at least two rails are made from high-density polyethylene (HDPE).

4. The cleaning apparatus according to claim 1, wherein the fluid pipe is made from high-density polyethylene (HDPE).

5. The cleaning apparatus according to claim 4, wherein the fluid pipe comprises nozzles.

6. The cleaning apparatus according to claim 1, further comprising an open cover.

7. The cleaning apparatus according to claim 1, further comprising at least two self-aligning bearings.

8. The cleaning apparatus according to claim 7, wherein each self-aligning bearing of the at least two is connected each wheel of the at least two wheels.

9. The cleaning apparatus according to claim 8, where one self-aligning bearing of the at least two self-aligning bearings is connected to the fluid conduit.

10. The cleaning apparatus according to claim 1, further comprising a solenoid valve.

11. The cleaning apparatus according to claim 1, further comprising at least one sensor.

12. The cleaning apparatus according to claim 1, further comprising a humidity sensor and a wind speed sensor.

13. The cleaning apparatus according to claim 1, wherein the at least two rails comprise grooves.

14. The cleaning apparatus according to claim 1, further comprising a check valve.

15. The cleaning apparatus according to claim 14, further comprising a line reversing valve.

16. The cleaning apparatus according to claim 15, wherein the check valve and the line reversing valve are in fluid communication with the fluid conduit.

17. The cleaning apparatus according to claim 1, further comprising a lever.

18. The cleaning apparatus according to claim 1, further comprising a timer.

19. The cleaning apparatus according to claim 1, wherein each wheel of the at least two wheels comprises cogs.

20. The cleaning apparatus according to claim 1, wherein a second end of the fluid pipe is sealed.

* * * * *